(12) United States Patent
Kobayashi

(10) Patent No.: US 11,613,173 B2
(45) Date of Patent: Mar. 28, 2023

(54) COOLING STRUCTURE FOR VEHICLE

(71) Applicant: SUBARU CORPORATION, Tokyo (JP)

(72) Inventor: Nobuaki Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 10 days.

(21) Appl. No.: 17/481,469

(22) Filed: Sep. 22, 2021

(65) Prior Publication Data

US 2022/0089014 A1    Mar. 24, 2022

(30) Foreign Application Priority Data

Sep. 24, 2020 (JP) ................. JP2020-159330

(51) Int. Cl.
*B60K 11/02* (2006.01)
*B60K 1/00* (2006.01)
*F16H 57/04* (2010.01)

(52) U.S. Cl.
CPC .............. *B60K 11/02* (2013.01); *B60K 1/00* (2013.01); *F16H 57/0476* (2013.01); *B60K 2001/003* (2013.01)

(58) Field of Classification Search
CPC ..... B60K 11/02; B60K 1/00; B60K 2001/003; F16H 57/0476
See application file for complete search history.

(56) References Cited

U.S. PATENT DOCUMENTS

| 2012/0313465 | A1* | 12/2012 | Prix | ............... H02K 5/203 310/59 |
| 2020/0266687 | A1* | 8/2020 | Nakamatsu | ........ H02K 21/145 |
| 2021/0039491 | A1* | 2/2021 | Merz | ............... F16H 57/0436 |
| 2022/0216820 | A1* | 7/2022 | Fukunaga | ............... B60L 50/60 |

FOREIGN PATENT DOCUMENTS

JP    2008-105645 A    5/2008

* cited by examiner

*Primary Examiner* — Jacob M Amick
(74) *Attorney, Agent, or Firm* — Smith, Gambrell & Russell, LLP

(57) ABSTRACT

A cooling structure for a vehicle. The vehicle includes a motor. The cooling structure includes a gear case, an inverter, and a cooling flow path. The gear case has an outer face and an inner face, and contains a gear mechanism and an oil. The inverter is provided on the outer face of the gear case, and configured to be electrically coupled to the motor. The cooling flow path is provided between the inner face of the gear case and the inverter, and configured to allow a refrigerant to flow therethrough.

8 Claims, 4 Drawing Sheets

COOLING STRUCTURE FOR VEHICLE

CROSS-REFERENCE TO RELATED APPLICATIONS

The present application claims priority from Japanese Patent Application No. 2020-159330 filed on Sep. 24, 2020, the entire contents of which are hereby incorporated by reference.

BACKGROUND

The technology relates to a cooling structure for a vehicle.

For example, Japanese Unexamined Patent Application Publication No. 2008-105645 discloses a technique that cools an inverter by circulating a refrigerant.

SUMMARY

An aspect of the technology provides a cooling structure for a vehicle. The vehicle includes a motor. The cooling structure includes a gear case, an inverter, and a cooling flow path. The gear case has an outer face and an inner face, and contains a gear mechanism and an oil. The inverter is provided on the outer face of the gear case, and configured to be electrically coupled to the motor. The cooling flow path is provided between the inner face of the gear case and the inverter, and configured to allow a refrigerant to flow therethrough.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
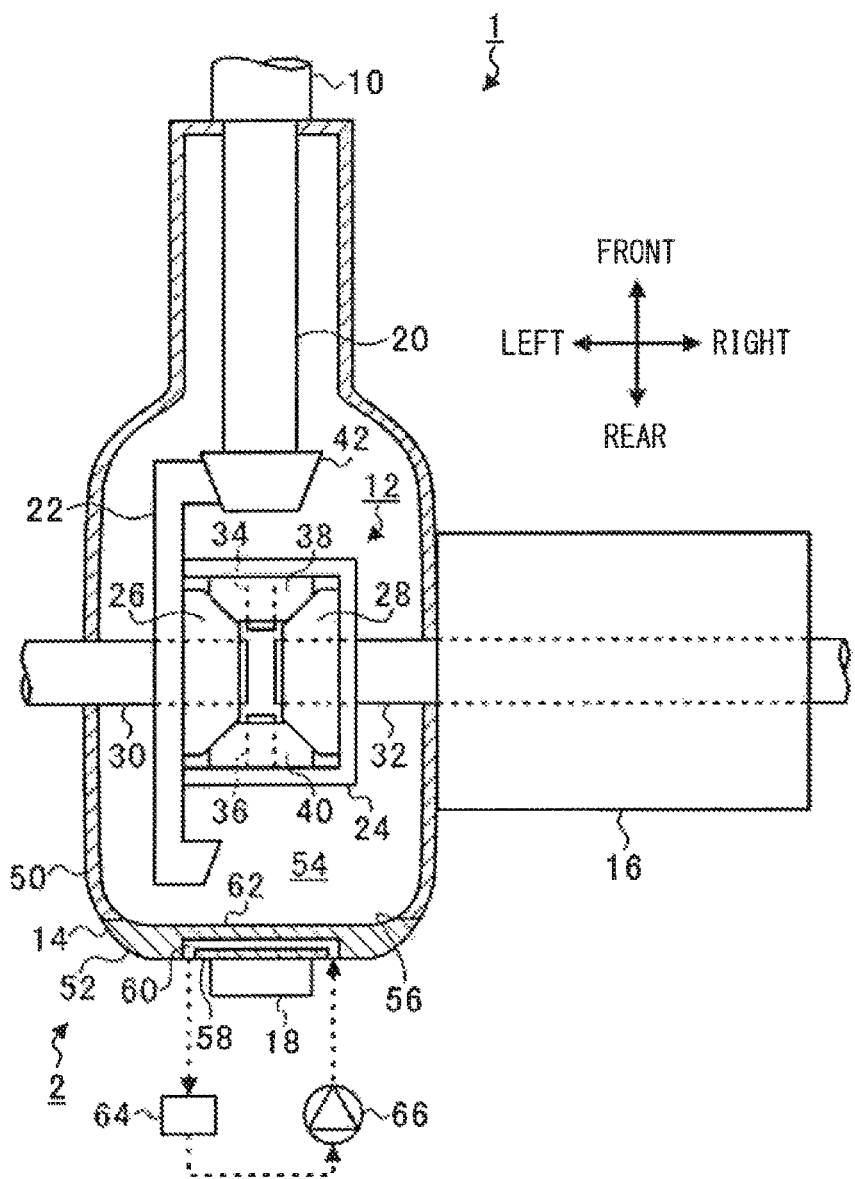
FIG. 1 is a diagram schematically illustrating a part of a vehicle to which a cooling structure for a vehicle according to one example embodiment of the technology is applied.

For example, a gear case of a gear mechanism such as a rear differential gear is provided with fins for cooling the gear mechanism. A vehicle includes such a cooling structure for each device to be cooled, including an inverter and the gear mechanism. Accordingly, a space required for providing the cooling structure is increased, making it difficult to improve a degree of freedom of vehicle designing.

It is desirable to provide a simplified cooling structure for a vehicle.

In the following, some embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

FIG. 1 schematically illustrates a part of a vehicle 1 to which a cooling structure 2 for a vehicle (hereinafter may be simply referred to as the "cooling structure 2") according to an example embodiment of the technology is applied. The cooling structure 2 may be applied to the vehicle 1. In FIG. 1, front, rear, right, and left directions of the vehicle 1 are denoted by respective solid arrows. For example, the vehicle 1 may be an electric vehicle that includes a motor as a drive source. In some embodiments, the vehicle 1 may be a hybrid vehicle that includes both an engine and the motor as the drive sources.

The vehicle 1 includes a gear case 14 and an inverter 18. The vehicle 1 may also include a propeller shaft 10, a rear differential gear 12, and a motor 16. The propeller shaft 10 may have a first end coupled to the drive source via a transmission. The rear differential gear 12, the gear case 14, and the inverter 18 may serve as constituent elements of the cooling structure 2.

The rear differential gear 12 may include an input shaft 20, a ring gear 22, a frame 24, a first side gear 26, a second side gear 28, a first output shaft 30, a second output shaft 32, a first pinion shaft 34, a second pinion shaft 36, a first pinion gear 38, and a second pinion gear 40.

The input shaft 20 may be, for example, a drive pinion shaft. The input shaft 20 may be coupled to a second end of the propeller shaft 10. The input shaft 20 may extend in the front and the rear directions. The input shaft 20 may have an end provided with a bevel gear 42. The bevel gear 42 may be in mesh engagement with the ring gear 22. The frame 24 may protrude from a side face of the ring gear 22. The frame 24 may be a hollow member. The frame 24 may be rotated integrally with the ring gear 22.

The first side gear 26, the second side gear 28, the first pinion gear 38, and the second pinion gear 40 may be provided in the frame 24. The first side gear 26 and the second side gear 28 may be disposed in parallel with the ring gear 22, and face each other with a gap being provided between the first side gear 26 and the second side gear 28. The first side gear 26 may be coupled to the first output shaft 30. The first output shaft 30 may so extend in the left direction as to penetrate the ring gear 22, and may be coupled to a left rear wheel. The second side gear 28 may be coupled to the second output shaft 32. The second output shaft 32 may so extend in the right direction as to penetrate the frame 24, and may be coupled to a right rear wheel.

The first pinion shaft 34 and the second pinion shaft 36 each may protrude from an inner face of the frame 24. The first pinion gear 38 may be rotatably supported by the frame 24 via the first pinion shaft 34. The second pinion gear 40 may be rotatably supported by the frame 24 via the second pinion shaft 36. The first pinion gear 38 and the second pinion gear 40 each may be in mesh engagement with the first side gear 26 and the second side gear 28.

The gear case 14 includes a case body 50 and a cover 52. The case body 50 may have a space 54 formed therein. The case body 50 may have an opening 56 on a rear side. The cover 52 may close the opening 56 of the case body 50 from the rear side. The gear case 14 may be hermetically sealed by the attachment of the cover 52 to the case body 50. The gear case 14 may be hermetically sealed with the rear differential gear 12 and an oil being contained inside the gear case 14. The oil may allow each part of the rear differential gear 12 to operate in a lubricated fashion.

The rear differential gear 12 can involve a generation of a frictional heat between its gears in response to a rotation of each of the gears. For example, a relatively large amount of frictional heat is generated between the bevel gear 42 of the input shaft 20 and the ring gear 22. The oil inside the gear case 14 is heated by such a frictional heat.

The motor 16 may be provided independently from a motor that is coupled to the rear differential gear 12 via the propeller shaft 10. The motor 16 may be provided side by side on the gear case 14, and may be coupled to the rear differential gear 12. For example, although unillustrated, the motor 16 may be coupled to the ring gear 22 or the frame 24. The motor 16 may assist a rotation of the rear wheels.

The inverter 18 is disposed on an outer face 58 of the cover 52 of the gear case 14. The inverter 18 is electrically coupled to the motor 16 via an unillustrated electric power line or the like. The inverter 18 may convert electric power of an unillustrated battery and supply the converted electric power to the motor 16. The inverter 18 generates a heat in response to a supply of an electric current to the motor 16.

The cooling structure 2 has a cooling flow path 60 provided in the cover 52 of the gear case 14. The cooling flow path 60 is provided between an inner face 62 of the cover 52 of the gear case 14 and the inverter 18. The cooling flow path 60 is configured to allow a refrigerant to flow therethrough. The refrigerant that flows through the cooling flow path 60 may cool both the oil inside the gear case 14 and the inverter 18, as will be described later in greater detail. The oil and the inverter 18 may serve as targets to be cooled by the cooling structure 2.

The vehicle 1 may also include a heat exchanger 64 and a cooling pump 66. It should be noted that positions at which the heat exchanger 64 and the cooling pump 66 are provided are not limited to the rear of the gear case 14. In some embodiments, the heat exchanger 64 and the cooling pump 66 may be provided at the front of the gear case 14. The cooling flow path 60, the heat exchanger 64, and the cooling pump 66 may form a cooling circuit through which the refrigerant circulates, as denoted by a broken-line arrow illustrated in FIG. 1. The heat exchanger 64 may cool the refrigerant delivered from the cooling flow path 60 of the gear case 14. The cooling pump 66 may deliver the refrigerant cooled by the beat exchanger 64 to the cooling flow path 60 of the gear case 14.

Figure 2:
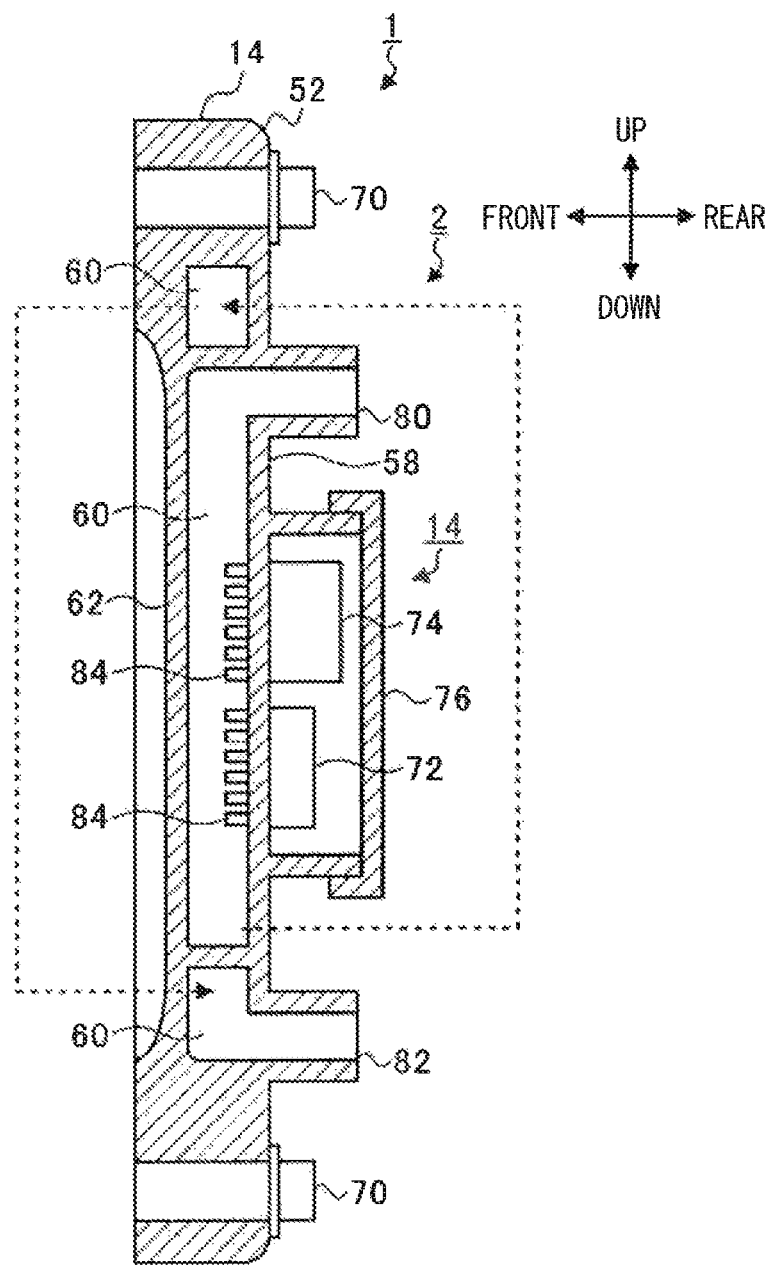
FIG. 2 is a schematic cross-sectional view of a cover illustrated in FIG. 1.

FIG. 2 schematically illustrates a cross-section of the cover 52. In FIG. 2, upward, downward, front, and rear directions of the vehicle 1 are denoted by respective solid arrows. It should also be noted that a broken-line arrow illustrated in FIG. 2 denotes a connection of the cooling flow path 60.

The cover 52 may be attached to the case body 50 by a fastener 70 such as a bolt. The inverter 18 may include a power module 72 and a capacitor 74 as illustrated in FIG. 2.

The power module 72 and the capacitor 74 may be fixed to the outer face 58 of the cover 52. The power module 72 and the capacitor 74 may be so fixed to the cover 52 that their respective heat dissipating faces are in contact with the cover 52. The power module 72 and the capacitor 74 may have electric terminals that are disposed on their respective faces different from the faces that are in contact with the cover 52, such as a side face of the power module 72 and a side face of the capacitor 74. The power module 72 and the capacitor 74 may be surrounded by and covered with a protector 76. The power module 72 and the capacitor 74 may be hermetically sealed by the cover 52 and the protector 76.

The power module 72 may include a plurality of semiconductor switching devices such as IGBTs (Insulated Gate Bipolar Transistors). For example, the power module 72 may have six semiconductor switching devices coupled in a three-phase bridge connection between direct-current terminals of the power module 72 that are coupled to the battery. The capacitor 74 may be an electrolytic capacitor, for example. For example, the capacitor 74 may be coupled in parallel between the direct-current terminals of the power module 72. The power module 72 and the capacitor 74 generate a heat upon supplying an electric current to the motor 16.

The outer face 58 of the cover 52 may have an inlet 80 and an outlet 82 that are open toward the rear. The cooling flow path 60 may be communicated from the inlet 80 to the outlet 82. The inlet 80 may be coupled to the cooling pump 66 through a member such as a pipe. The outlet 82 may be coupled to the heat exchanger 64 through a member such as a pipe.

The cooling flow path 60 is provided between the inner face 62 of the cover 52 and the inverter 18 as described above. In some embodiments, the cooling flow path 60 may be so provided as to pass between the inner face 62 of the cover 52 and the capacitor 74 and between the inner face 62 of the cover 52 and the power module 72.

The oil inside the gear case 14 is in contact with the inner face 62 of the cover 52. Thus, the oil inside the gear case 14 is heat-exchanged with and thus cooled by the refrigerant in the cooling flow path 60 via the inner face 62 of the cover 52. In addition, the power module 72 and the capacitor 74 are in contact with the outer face 58 of the cover 52. Thus, the power module 72 and the capacitor 74 are heat-exchanged with and thus cooled by the refrigerant in the cooling flow path 60 via the outer face 58 of the cover 52.

As described above, the cooling structure 2 makes it possible to cool both the oil inside the gear case 14 and the inverter 18 by the common refrigerant that flows through the cooling flow path 60. Thus, for example, the cooling structure 2 makes it possible to eliminate the necessity of providing a cooling fin on the gear case 14. Hence, the cooling structure 2 makes it possible to suppress an increase in a space required for providing a cooling structure.

Accordingly, the cooling structure 2 according to an example embodiment makes it possible to simplify a cooling structure and to improve a degree of freedom of vehicle designing.

In addition, a heat-resisting temperature of the oil inside the gear case 14 exceeds 100 degrees centigrade, for example, whereas a heat-resisting temperature of each of the power module 72 and the capacitor 74 is less than 100 degrees centigrade, e.g., about 80 degrees centigrade. In some cases, a temperature of the oil inside the gear case 14 can become higher than the heat-resisting temperature of each of the power module 72 and the capacitor 74.

The cooling structure 2, however, causes the refrigerant to flow between the oil inside the gear case 14 and the power module 72 and between the oil inside the gear case 14 and the capacitor 74. Thus, the cooling structure 2 hinders, by the refrigerant, the heat of the oil inside the gear case 14 from being transferred to the power module 72 and the capacitor 74.

Accordingly, the cooling structure 2 makes it possible to allow temperatures of the power module 72 and the capacitor 74 to be less than their respective heat-resisting temperatures, even if the temperature of the oil inside the gear case 14 becomes equal to or higher than the heat-resisting temperatures of the power module 72 and the capacitor 74. Hence, the cooling structure 2 makes it possible to prevent a damage of the inverter 18, even in a case where the inverter 18 is provided on the outer face 58 of the gear case 14.

In some embodiments, the power module 72 and the capacitor 74 may be provided side by side in the upward and the downward directions. In addition, the cooling flow path 60 may be so provided as to be communicated in the upward and the downward directions in the vicinity of the power module 72 and the capacitor 74. Thus, even if a slight amount of air is mixed in the refrigerant, the air moves upward. Hence, the cooling structure 2 makes it possible to suppress a retention of the air inside the refrigerant at a location in the vicinity of the power module 72 and the capacitor 74, and thereby to prevent a decrease in an effect of cooling the inverter 18.

In some embodiments, as illustrated in FIG. 2, the gear case 14 may have a plurality of fins 84 that protrudes from an inner face of the cooling flow path 60 toward the inside of the cooling flow path 60. The fins 84 may be provided in a region, of the inner face of the cooling flow path 60, that is on an opposite side of a region in which the inverter 18 is in contact with the gear case 14. For example, the fins 84 may be provided in a region, of the inner face of the cooling flow path 60, that is on an opposite side of a region in which the power module 72 is in contact with the gear case 14, and may be provided in a region, of the inner face of the cooling flow path 60, that is on an opposite side of a region in which the capacitor 74 is in contact with the gear case 14. In some embodiments, the fin 84 may have a prism shape that extends from the inner face of the cooling flow path 60, although a shape of the fin 84 is not limited to the prism shape. In some embodiments, the fin 84 may have any shape designed on an as-needed basis, such as a pyramid shape.

The cooling structure 2 may have the fins 84 at a position in the vicinity of the inverter 18, thereby increasing the area for a heat exchange between the refrigerant that flows through the cooling flow path 60 and the inverter 18. Thus, the cooling structure 2 makes it possible to improve the effect of cooling the inverter 18.

In one example, the vehicle 1 may be a mechanical four-wheel drive vehicle that uses the propeller shaft 10. The mechanical four-wheel drive vehicle can cause a vibration of the rear differential gear 12 due to, for example, a phase difference in terms of power transmission between the front wheels and the rear wheels. To address this, the mechanical four-wheel drive vehicle has an inertia mass, i.e., a ballast, at a position on a rear side of the gear case 14 of the rear differential gear 12.

In some embodiments, the vehicle 1 may have the inverter 18 provided on a face, of the gear case 14, that is positioned on a rear side of the vehicle 1 as described above. The inverter 18 has a relatively large mass, allowing the inverter 18 to serve as at least a part of the inertia mass described above. Thus, it is possible for the vehicle 1 to reduce the inertia mass to be added to the vehicle 1 by an amount corresponding to the mass of the inverter 18. Hence, the vehicle 1 to which the cooling structure 2 is applied makes it possible to suppress an increase in a gross weight of the vehicle 1.

Figure 3:
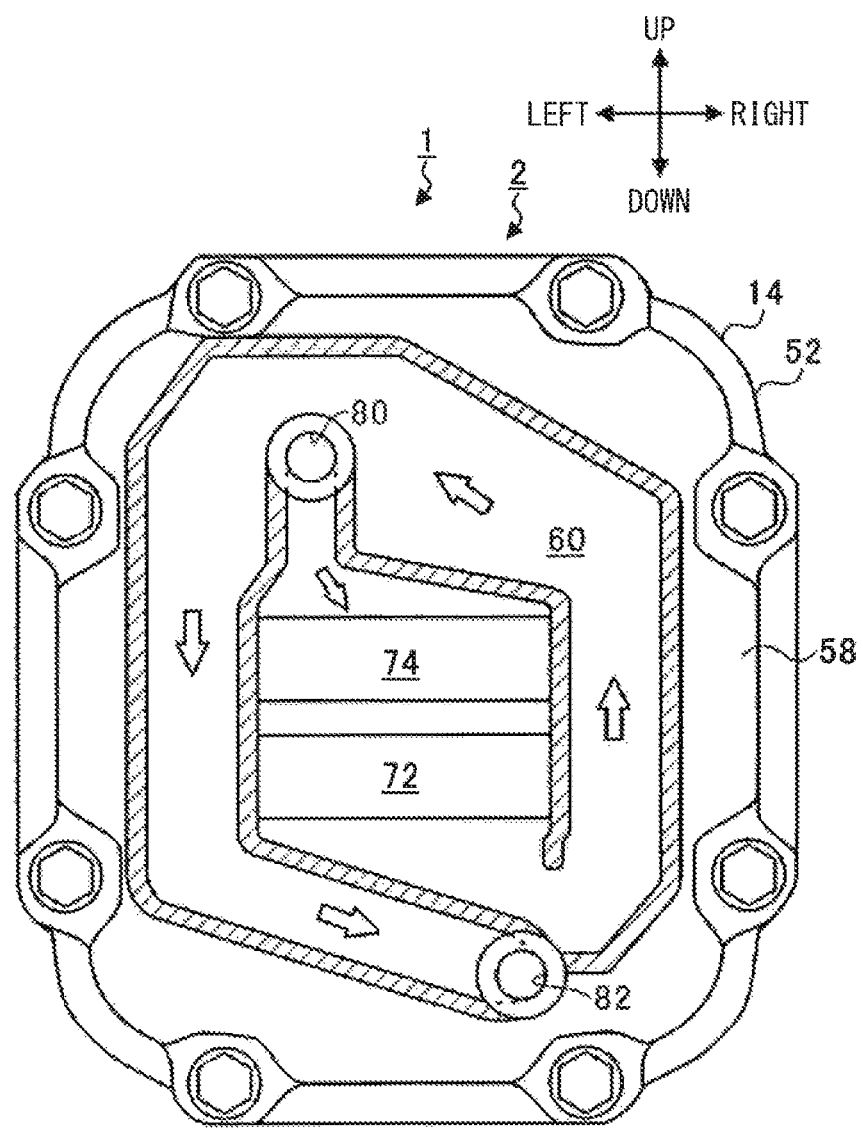
FIG. 3 is a perspective plan view of the cover as viewed from the rear.

FIG. 3 is a perspective plan view of the cover 52 as viewed from the rear. In FIG. 3, upward, downward, right, and left directions of the vehicle 1 are denoted by respective solid arrows. It should also be noted that a white arrow illustrated in FIG. 3 exemplifies a direction of flow of the refrigerant.

The power module 72 and the capacitor 74 may be disposed around the middle of the outer face 58 of the cover 52. The inlet 80 may be positioned above the power module 72 and the capacitor 74. The outlet 82 may be positioned below the power module 72 and the capacitor 74.

As illustrated in FIG. 3, the cooling flow path 60 may be so provided as to extend spirally from an inner part of the outer face 58 positioned close to the middle of the outer face 58 toward an outer part of the outer face 58 positioned away from the middle of the outer face 58. The inlet 80 may be positioned at an inner end of the spiral of the cooling flow path 60. The outlet 82 may be positioned at an outer end of the spiral of the cooling flow path 60. The power module 72 and the capacitor 74 may be positioned in the vicinity of the inlet 80 on a route of the cooling flow path 60.

The refrigerant entered from the inlet 80 may first pass through a region around the capacitor 74 and a region around the power module 72 in this order. This configuration allows the capacitor 74 and the power module 72 to be cooled by the refrigerant in which a cooling capability is sufficiently high, i.e., a temperature is sufficiently low. Thus, the cooling structure 2 makes it possible to effectively cool the inverter 18.

The refrigerant having passed through the region around the power module 72 may circulate around the periphery of the cover 52 to reach the outlet 82. Thus, the refrigerant cools a wide region including the inner face 62 and the outer face 58 of the cover 52. Hence, it is possible to effectively cool the oil that is in contact with the inner face 62 of the cover 52. In addition, the capacitor 74 and the power module 72 are often lower in temperature than the oil as described above. Thus, it is possible for the refrigerant following the heat exchange with the capacitor 74 and the power module 72 to sufficiently cool the oil.

Figure 4:
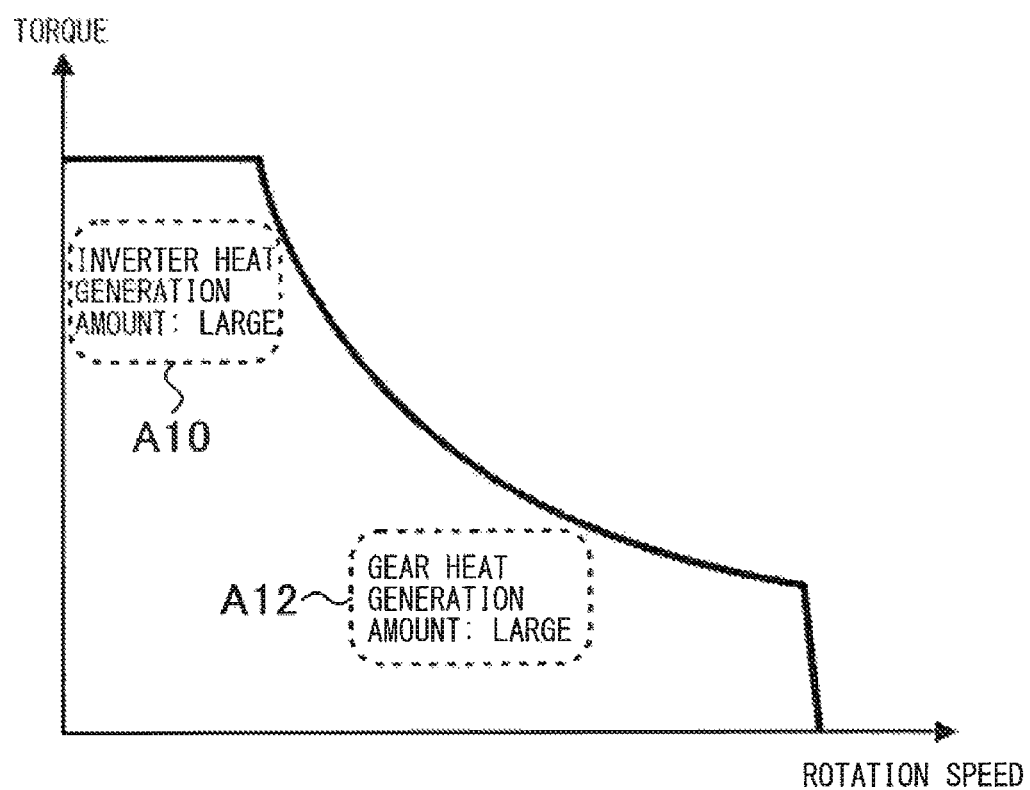
FIG. 4 is a diagram illustrating an example of an output characteristic of a motor illustrated in FIG. 1.

FIG. 4 illustrates an example of an output characteristic of the motor 16. Referring to FIG. 4, a torque of the motor 16 becomes higher as a rotation speed of the motor 16 becomes lower, and the torque becomes lower as the rotation speed becomes higher.

The inverter 18 increases an electric current to be supplied to the motor 16 in response to an increase in the torque of the motor 16. Accordingly, the inverter 18 can involve an increase in an amount of heat generation with the increase in the torque of the motor 16, as exemplified by a broken line A10 illustrated in FIG. 4.

A rotation speed of each gear of the rear differential gear 12 increases with the increase in the rotation speed of the motor 16. The increase in the rotation speed of each gear can lead to an increase in an amount of heat generation resulting from a friction between the respective gears. Accordingly, the rear differential gear 12 can involve an increase in an amount of heat generation with the increase in the rotation speed of the motor 16, as exemplified by a broken line A12 illustrated in FIG. 4.

In some embodiments, the inverter 18 so supplies the electric current to the motor 16 as to cause a timing at which the amount of heat generation of the inverter 18 increases and a timing at which the amount of heat generation of the rear differential gear 12 increases to be different from each other.

This makes it sufficient for the inverter 18 to be less cooled in the cooling structure 2 in a case where it is necessary to significantly cool the oil inside the gear case 14, and makes it sufficient for the oil inside the gear case 14 to be less cooled in the cooling structure 2 in a case where it is necessary to significantly cool the inverter 18. Thus, the cooling structure 2 makes it possible to cool the oil inside the gear case 14 and the inverter 18 while suppressing an increase in size of the heat exchanger 64 or the cooling pump 66.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the inverter 18 may be proved on the outer face 58 of the cover 52 in an example embodiment described above. In some embodiments, the inverter 18 may be provided on an outer face of the case body 50 instead of providing the inverter 18 on the cover 52.

The inverter 18 may be disposed at a position, of the gear case 14, that is on the rear side of the vehicle 1 in an example embodiment described above. In some embodiments, the inverter 18 may be provided at any position of the gear case 14 instead of providing the inverter 18 at the position, of the gear case 14, on the rear side of the vehicle 1. However, it is advantageous to provide the inverter 18 at the position, of the gear case 14, on the rear side of the vehicle 1 in a case where the inverter 18 serves as a part of the inertia mass.

The cooling structure 2 may have the fins 84 in the cooling flow path 60 in an example embodiment described above. In some embodiments, the fins 84 may be eliminated. However, it is advantageous to provide the fins 84 in order to increase the effect of cooling the inverter 18.

The gear case 14 that contains the rear differential gear 12 may be provided with the inverter 18 and the cooling flow path 60 in an example embodiment described above. However, the gear case 14 provided with the inverter 18 and the cooling flow path 60 is not limited to the gear case that contains the rear differential gear 12. In some embodiments, the gear case 14 may contain a gear mechanism of any of various types, such as a front differential gear, a transmission, or a reducer. The oil that allows such a gear mechanism to operate in a lubricated fashion may be provided inside the gear case 14 that contains the gear mechanism. The cooling structure 2 according to any of such alternative embodiments makes it possible to cool both the oil inside the gear case 14 and the inverter 18 by the common refrigerant as with an example embodiment described above.

The invention claimed is:

1. A cooling structure for a vehicle, the vehicle including a motor, the cooling structure comprising:

a gear case having an outer face and an inner face, and containing a gear mechanism and an oil;

an inverter provided on the outer face of the gear case, and configured to be electrically coupled to the motor; and a cooling flow path provided between the inner face of the gear case and the inverter, and configured to allow a refrigerant to flow therethrough.

2. The cooling structure according to claim 1, wherein the vehicle further includes a propeller shaft, the gear mechanism comprises a rear differential gear configured to be coupled to the propeller shaft, and the inverter is provided on a face of the gear case, the face being positioned on a rear side of the vehicle.

3. The cooling structure according to claim 1, further comprising a fin provided in a region of an inner face of the cooling flow path, the region being on an opposite side of a region in which the inverter is in contact with the gear case, the fin protruding from the inner face of the cooling flow path toward inside of the cooling flow path.

4. The cooling structure according to claim 2, further comprising a fin provided in a region of an inner face of the cooling flow path, the region being on an opposite side of a region in which the inverter is in contact with the gear case, the fin protruding from the inner face of the cooling flow path toward inside of the cooling flow path.

5. The cooling structure according to claim 1, wherein the inverter is configured to supply an electric current to the motor to cause a timing at which an amount of heat generation of the inverter increases and a timing at which an amount of heat generation of the gear mechanism increases to be different from each other.

6. The cooling structure according to claim 3, wherein the inverter is configured to supply an electric current to the motor to cause a timing at which an amount of heat generation of the inverter increases and a timing at which an amount of heat generation of the gear mechanism increases to be different from each other.

7. The cooling structure according to claim 4, wherein the inverter is configured to supply an electric current to the motor to cause a timing at which an amount of heat generation of the inverter increases and a timing at which an amount of heat generation of the gear mechanism increases to be different from each other.

8. The cooling structure according to claim 2, wherein the inverter is configured to supply an electric current to the motor to cause a timing at which an amount of heat generation of the inverter increases and a timing at which an amount of heat generation of the gear mechanism increases to be different from each other.

* * * * *